United States Patent
Behm et al.

(10) Patent No.: US 6,736,324 B2
(45) Date of Patent: May 18, 2004

(54) LOTTERY TICKET BAR CODE

(75) Inventors: William F. Behm, Roswell, GA (US); Fred Finnerty, Dawsonville, GA (US)

(73) Assignee: Scientific Games Inc., Alpharetta, GA (US)

( * ) Notice: Subject to any disclaimer, the term of this patent is extended or adjusted under 35 U.S.C. 154(b) by 0 days.

(21) Appl. No.: 10/278,892

(22) Filed: Oct. 24, 2002

(65) Prior Publication Data

US 2003/0042317 A1 Mar. 6, 2003

Related U.S. Application Data

(63) Continuation of application No. 09/557,337, filed on Apr. 24, 2000, now Pat. No. 6,435,408, which is a division of application No. 09/165,666, filed on Oct. 3, 1998, now Pat. No. 6,053,405, which is a continuation-in-part of application No. 08/837,304, filed on Apr. 11, 1997, now Pat. No. 5,818,019, which is a division of application No. 08/263,890, filed on Jun. 22, 1994, now Pat. No. 5,471,039, and a continuation-in-part of application No. 08/486,588, filed on Jun. 7, 1995, now Pat. No. 5,621,200.

(60) Provisional application No. 60/350,216, filed on Nov. 2, 2001.

(51) Int. Cl.[7] .............................................. G06K 19/00
(52) U.S. Cl. ...................................... 235/487; 283/903
(58) Field of Search ........................... 235/487, 462.01; 283/100, 101, 102, 901, 902, 903

(56) References Cited

U.S. PATENT DOCUMENTS

| | | | | |
|---|---|---|---|---|
| 4,174,857 A | * | 11/1979 | Koza | ........................... 283/101 |
| 4,398,708 A | * | 8/1983 | Goldman et al. | .............. 270/18 |
| 4,725,079 A | * | 2/1988 | Koza et al. | ..................... 283/73 |
| 4,850,618 A | * | 7/1989 | Halladay, Jr. | ................. 283/94 |
| 5,286,061 A | * | 2/1994 | Behm. William F. | .......... 283/95 |
| 5,431,452 A | * | 7/1995 | Chang et al. | .................. 283/95 |
| 5,791,990 A | * | 8/1998 | Schroeder et al. | ............. 463/17 |
| 5,835,576 A | * | 11/1998 | Katz | ........................ 379/93.13 |
| 6,273,817 B1 | | 8/2001 | Sultan | .......................... 463/17 |
| 6,308,991 B1 | * | 10/2001 | Royer | ......................... 283/102 |

FOREIGN PATENT DOCUMENTS

| | | | | | |
|---|---|---|---|---|---|
| GB | | 2171054 A | * | 8/1986 | ........... B42D/15/00 |
| WO | | WO 9952691 | | 8/1999 | |

* cited by examiner

*Primary Examiner*—Diane I. Lee
(74) *Attorney, Agent, or Firm*—Michael B. McMurry

(57) ABSTRACT

Security can be provide for lottery tickets having data printed thereon in a bar code or other machine readable media by covering only a portion of the bar code with a scratch-off material. Removing the scratch-off material, or in some cases only a portion of the scratch-off material, can permit machine validation of the lottery tickets. For bar codes having a specified level of redundancy, it is desirable to cover at least enough of the bar code so as to prevent the machine reading of ticket validation data encoded in the bar code. Also, a lottery ticket can include a bar code printed on the ticket having both inventory and validation data along with a bar code printed on the front of the ticket including the validation data. All or part of the bar code printed on the front of the ticket can be covered by a scratch-off material.

40 Claims, 1 Drawing Sheet

LOTTERY TICKET BAR CODE

This application is a continuation of Ser. No. 09/557,337 flied Apr. 24, 2000 (U.S. Pat. No. 6,435,408); which is a division of Ser. No. 09/165,666 filed Oct. 3, 1998 (U.S. Pat. No. 6,053,405); which is a continuation in part of Ser. No. 08/837,304 filed Apr. 11, 1997 (U.S. Pat. No. 5,818,019); which is a continuation in part of Ser. No. 08/263,890 filed Jun. 22, 1994 (U.S. Pat. No. 5,471,039); and a continuation in part of Ser. No. 08/486,588 filed Jun. 7, 1995 (U.S. Pat. No. 5,621,200). This application also claims priority from Provisional Application No. 60/350,216 filed Nov. 2, 2001.

FIELD OF THE INVENTION

This invention generally relates to lottery tickets and in particular to lottery ticket bar codes.

BACKGROUND OF THE INVENTION

It has become conventional for lottery tickets that have a scratch-off material covering play indicia printed on the ticket to also provide a bar code printed on the ticket for validation or authentication purposes. Typically, when a winning ticket is presented for payment, the bar code is read by a bar code reader located in a lottery agent terminal and a 3 or 4 digit security code, hidden under a latex or scratch-off coating, is entered manually by a clerk using a key pad on the terminal. The dual action of reading the bar code and entering the security code confirms that the ticket is indeed a winner prior to payment of the winning amount. Forcing the clerk to find and enter the security code gives both the player and the lottery administration the assurance that a retailer did not prescreen the ticket in an attempt to pick out winning tickets because finding the security code requires that some latex must removed from the ticket. However, attempts have been made to defraud players lotteries where the clerks pre-screening tickets for winners before they are sold by picking out the 3 or 4 digit code security code, guessing the 3 digit code or even pasting an entirely different bar code over the existing bar code on the lottery ticket.

One approach to overcoming the problem of prescreening of unsold tickets is described in U.S. Pat. No. 6,053,405 where latex sensing capability is used to insure that that sufficient latex has been removed from the ticket prior to validation. Also, circuit elements are printed underneath the bar code in order to detect tampering with the bar code. Using this technique it is possible to print the bar code on the front or the back of the ticket, separate from the latex covering.

A second approach to overcoming this problem is described in U.S. Pat. No. 6,308,991 where a scratch-off material is printed over the entire bar code. Either the bar code alone is covered by a separate portion of the scratch-off material or the bar code in combination with play indicia is covered by the scratch-off material. However, covering the entire bar code has at least one significant disadvantage. In this approach, almost all of the scratch-off material must be removed from the bar code in order to be able to have the bar code successfully read by a scanner. Requiring a player or a lottery agent to completely remove a scratch-off coating from a bar code, especially on an instant lottery ticket where speed and convenience of redemption are desirable characteristics of this product, can result in a time consuming and inefficient method of operation.

SUMMARY OF THE INVENTION

It is therefore an object of the invention to provide a lottery ticket having a bar code that is only partially covered by a scratch-off material.

It is another object of the invention to provide a lottery ticket having a bar code containing validation data where only a portion of the bar code is covered by a scratch-off material such that the validation data cannot be read by a bar code reader without removing the scratch-off material. The scratch-off material can have a predetermined shape such as a circle in order to facilitate evidence of tampering. Alternatively, the scratch-off material can be printed over the bar code as a horizontal or vertical strip obscuring a predetermined portion of the data in the bar code. For example, when using a 2 dimensional code, such as PDF-417, vertical stripes can be used to obscure one or more columns of data in the bar code.

A further object of the invention is to provide a lottery ticket having a bar code containing validation data formatted, in for example code words, having a predetermined level of redundancy where only a portion of the validation data or code words is covered by a scratch-off material such that the portion of code words covered by the scratch-off material exceeds the level of redundancy sufficiently to prevent decoding of the validation data without removing at least a portion of the scratch-off material.

Yet another object of the invention to provide a lottery ticket having a bar code containing validation data where only a portion of the bar code is covered by a scratch-off material such that the validation data cannot be read by a bar code reader without removing the scratch-off material and where the scratch-off material includes a printed instruction to remove the scratch-off material. The scratch-off material can also be printed with an indication of prizes that can be won as an incentive to rub off the material.

Still another object of the invention is to provide a lottery ticket having bar code with minimum information content on the front of the ticket that is at least partially covered by a scratch-off material such that the ticket can be securely validated in a keyless manner after the scratch-off material has been removed.

DETAILED DESCRIPTION OF THE INVENTION

Figure 1:
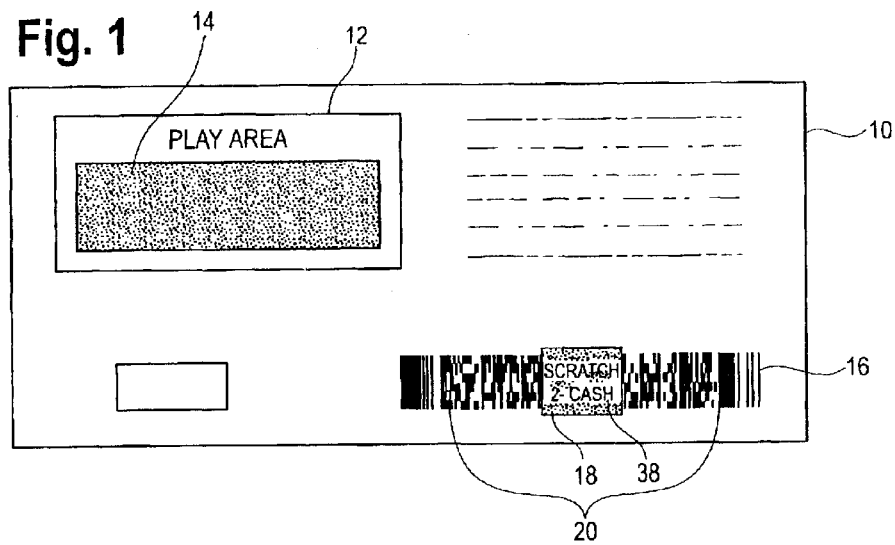
FIG. 1 is a plan view of a lottery ticket having a two dimensional (2-D) PDF-417 bar code where a portion of the bar code is covered by a scratch-off coating according to the invention.

FIG. 1 illustrates the front of a conventional instant type lottery ticket 10 having a play area 12 covered by a scratch-off material 14 which is usually comprised of a latex based composition printed over play indicia (not shown). In this embodiment of the invention, a two dimensional (2-D) bar code 16 containing validation data as well as inventory data is printed on the lottery ticket 10. In order insure the removal of a scratch-off material prior to the validation of the ticket 10, a portion of the bar code 16 is covered by a scratch-off material 18. The scratch-off material 18 can be the same as the scratch-off material 14 printed on the play area 12 of the lottery ticket. Here, only a portion of the bar code 16 is covered by the scratch-off material 18 to make it easier for a player or lottery agent to remove the scratch-off material 18 during the validation process. This will also facilitate the validation process since players in particular are unlikely to take the time to remove a scratch-off material that covers an entire bar code which can result in substantial work for the retailer's clerk or a substantial number, of misreads from a bar code scanner in a lottery terminal. However, the scratch-off material 18 should cover a sufficient portion of the bar code 16 in order to prevent validation of the lottery ticket 10 if the bar code 16 is read by a bar code reader prior to removal of the scratch-off material.

It should be noted that the use of the term "bar code" as used herein in the context of the invention generally represents optically machine readable information printed on a lottery ticket and would include for example optical character recognition (OCR) type characters, information printed in various matrix schemes, such as the Data Matrix 2-D bar code described at idautomation.com, as well as other optically readable information that might be developed in the future.

In the embodiment of the invention shown in FIG. 1, the valuation data is stored in the bar code 16 as PDF (Portable Data Code) code words printed in a 2-D bar code format in the data region 20 of the bar code 16. Preferably, the code words will have a predetermined level of redundancy. For example, where the data region 20 has 3 columns and 6 rows with 18 code words, a level 2 error correction permits decoding with up to 8 code words unreadable. Therefore, at least 9 code words should preferably be covered by the scratch-off material 18 to prevent the reading of the validation data without removing any of the scratch-off material 18. Similarly, in the data region 20 where there are 6 columns and 6 rows with 36 code words, a level 3 error correction would permit reading of the validation data with 16 code words being unreadable. Here, at least 17 code words should preferably be covered to prevent reading of the bar code data. Thus, it is desirable to cover at least one more code word or other type of redundant data in the bar code 16 than required to make the data in the data region 20 readable. This arrangement using PDF codes with specified levels of redundancy, also has a very significant advantage. Since it is only necessary remove enough of the scratch-off coating to make the minimum number of code words required to decode the validation data readable, the player or lottery agent only has to remove a comparatively small portion of the scratch-off material. In the cases of the level 2 and 3 error correction described above, only one code word would need to be removed by the player to make the valuation data stored in the bar code 16 readable. Thus, it is not necessary to rely on diligent and thorough removal of the scratch-off material 12 to have an efficient validation process.

In general, it is desirable to also cover with the scratch-off material any information in a bar code redundant to the information in the bar code that is covered by the scratch-off material to prevent machine reading of the validation data and this redundant information can include error correction codes built into the bar code such as, for example, a Reed Solomon error correction code integrated into an ECC200 Data Matrix bar code.

Figure 2A:
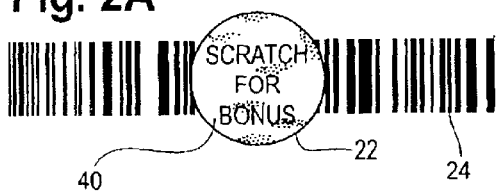
FIGS. 2A, 2B, 2C and 2D are plan views of alternate bar codes for use with the lottery ticket of FIG. 1 including in FIG. 2A a conventional one dimensional (1-D) interleaved 2 of 5 bar code having a portion of the code covered by a scratch-off coating according to the invention.
Figure 2B:
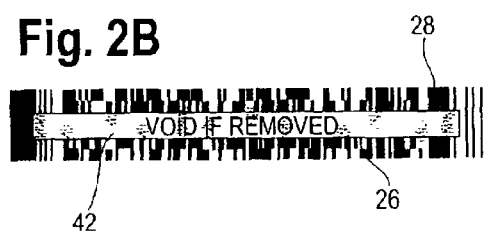
Figure 2C:
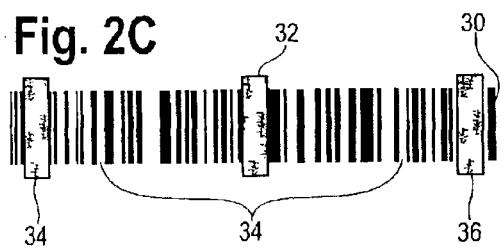

FIGS. 2A–2C illustrate different shapes of the scratch-off material that can be used to cover a portion of the bar code on the lottery ticket 10. The scratch-off material 18 is shown in FIG. 1 as a rectangle covering a data region 20 of the bar code 16. However, other shapes or configurations of the scratch-off material can be used as well. In some circumstances, shapes that are designed to enhance visual evidence of tampering can be used. As shown in FIG. 2A, printing a scratch-off material 22 in a circular configuration over a portion of a bar code 24 is one such example. FIG. 2B illustrates a scratch-off material 26 printed in a horizontal strip across a portion of a bar code 28. In this case, the bar code 28 is a two-dimensional bar code and the strip 26 is placed to cover a sufficient number of code words to prevent reading the bar code 28. Also, as shown in FIG. 2C, the scratch-off material can be printed over a bar code 30 in one or more vertical strips such as a vertical strip 32 covering a portion of a data region 34 of the bar code 30. Also, vertical strips, for example a pair of strips 34 and 36 of the scratch-off material, can be printed over the start pattern and stop pattern (not shown) of the bar code 30 although covering these patterns is not preferable because reading by a bar code reader is made easier by simply positioning photocopies of start and/or stop codes over the latex. In some circumstances, shapes that are designed to enhance visual evidence of tampering can be used.

To enhance player participation and the validation process, the scratch-off materials 18, 22, 32, 34 and 36 can include human readable information such as incentives to scratch-off this material. As shown in FIG. 1, the scratch-off material 18 is printed with an instruction "scratch 2-Cash". Other incentives, such as "Scratch For Bonus" 40 as shown in FIG. 2A, or "Rub For Prize Value" can be printed on the scratch-off material 22 that indicate that a bonus prize is printed on the lottery ticket 10 under the scratch-off material 22. Similarly, a "Void If Removed" instruction 42 can be printed over the scratch-off material 26 as depicted in FIG. 2B. This instruction 42 is similar to some conventional lottery tickets where a "Void If Removed" instruction is printed on a scratch-off material covering human readable validation digits where the scratch-off material is removed by the lottery agent when the ticket is presented for redemption.

Figure 2D:
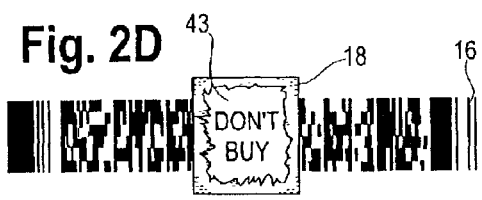

FIG. 2D shows another embodiment of the invention that can enhance the security of the lottery ticket 10. Here, under a scratch-off material such as 18 on the bar code 16, a consumer warning 43 can be printed such as "Don't Buy". In this case, the warning 43 will indicate to the player that the scratch-off material 18 has been improperly removed and consequently should not buy the lottery ticket 10. Preferably, the warning 43 should not interfere with the reading of the bar code 16. For example, if the warning 43 is printed in a red ink, this text will not interfere with read of the bar code 16 since bar code readers typically illuminate the bar code in red light.

With reference to FIG. 2C where the bar code 30 is printed in a one-dimensional (1-D) bar code format, in some cases it would only be necessary to cover the portion of the bar code 30 that corresponds to the human readable validation data securely printed below the scratch-off material, 32. For example, instant lottery tickets generally have the following data printed on the ticket in human readable form:

| Data | Length | Location Printed | Covered by Latex |
| --- | --- | --- | --- |
| Game number: | 3 digits | Ticket back | No |
| Pack number: | 6 digits | Ticket back | No |
| Ticket number: | 3 digits | Ticket back | No |
| Validation number: | 9 digits | Ticket front | Yes |
| Security code: | 3 digits | Ticket front | Yes |

-continued

| Data | Length | Location Printed | Covered by Latex |
|---|---|---|---|
| Checksum | 2 digits | Ticket front | Yes |
| Total: | 24 digits | | |

The bar codes printed on instant tickets typically use the Interleaved 2 of 5 (I 2 of 5) format. In such a bar code the information is arranged in pairs of digits. Each pair of digits corresponds to a single bar code character. So, the above 24 digits of data would be represented by twelve I 2 of 5 bar code characters. Since the game, pack and ticket number are often printed in human readable form on the back of the lottery ticket 10, there is no security reason to cover these digits with latex when printed in a bar code. Thus, in one embodiment of the invention, only those bar code characters that correspond to the validation information are concealed under the scratch-off material 32. In this case, that would correspond to the 12 digits of the validation number and security code. This results in the bar code 30 having just 12 of its 24 digits of data, or 50% of its data, covered by the scratch-off material 32.

However, this still results in a large portion of the bar code 30 being covered by the scratch-off material 32 because it is standard practice in the lottery industry to print the validation number in the I 2 of 5 bar code along with the inventory control information and the checksum. Often, one or more of the security code digits is not printed in the I 2 of 5 bar code. Accordingly it is preferable in certain cases to print a conventional I 2 of 5 bar code such as 30 with only the bar code characters corresponding to the security code obscured by the scratch-off material 32. Thus, in this example, only 2 of the 12 bar code characters are covered with the scratch-off material 32, or approximately 16.7% of the characters. This results in a lottery ticket 10 having the minimal amount of the scratch-off material 32 that has to be removed to validate the ticket 10 yet having security equivalent to conventional lottery tickets where the security digit(s) are not present in the bar code. Or, in bar codes where the security digits are present, covering the security digits with the scratch-off material 32 can increase security.

In another technique commonly used to print information in an I 2 of 5 bar code the 9-digit validation number and the 3-digit security code and compressed and encrypted into a 10-digit string of encrypted validation data. This encrypted string is then printed in the clear in the I 2 of 5 bar code along with the inventory control data and checksum. This results in an I 2 of 5 bar code containing 22 decimal digits or 11 bar code characters. With this type of bar code only a small amount of the code need be covered by the scratch-off material 32 to prevent it from being read by a bar code reader prior to the lottery ticket 10 being sold to the public. With a conventional 1-D code, such as I 2 of 5, only the smallest of obstructions can prevent the code from being read. In some cases, simply covering a single narrow space between two of the vertical bars of the bar code will prevent it from being read. However, such a small covering were partially removed, prior to the sale to the public, it would probably not be noticed by the player. Therefore, it is preferable that the amount of scratch-off material 32 covering the bar code 30 should be sufficiently distinctive that its removal or tampering would be evident to a player.

Figure 3A:
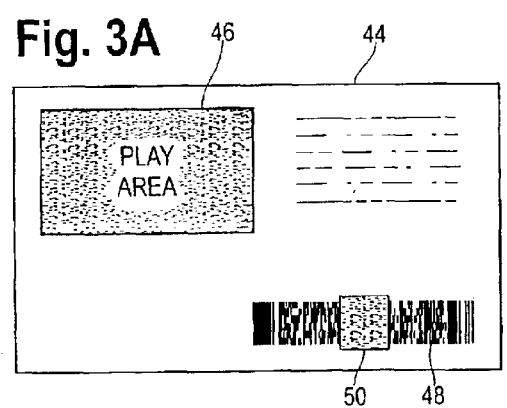
FIG. 3A is a plan view of the front of a lottery ticket having a bar code containing a security code where the bar code is partially covered by a scratch-off coating.
Figure 3B:
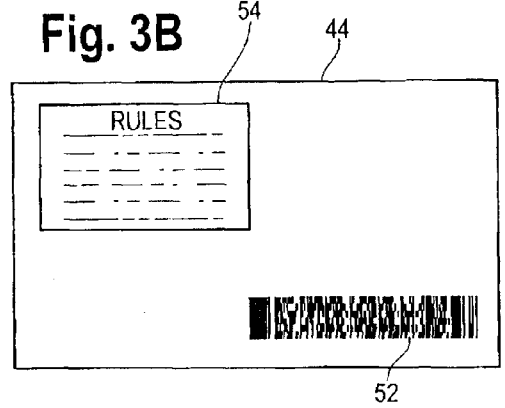
FIG. 3B is a plan view of the back of the lottery ticket of FIG. 3A having a bar code printed on the back of the ticket containing at a minimum all of the other data required to validate the ticket.

Referring to FIGS. 3A and 3B, one problem with placing a conventional lottery ticket bar code on the front of the ticket, such as the bar code 16 on the lottery ticket 10 shown in FIG. 1, is that the bar code 16 consumes valuable space that can otherwise be used for graphics, advertising, instructional information or the instant lottery game play data itself. That is why printing bar codes on the back of lottery tickets has become the industry standard. Furthermore, even if all of the data required to validate the lottery ticket is contained in front bar code, partially or totally covered by latex, it is generally still desirable to have uncovered bar codes on lottery tickets that can be used for inventory control, manufacturing and distribution. In one embodiment of the invention depicted in FIGS. 3A and 3B, the front of a lottery ticket 44 is printed with a play area 46 and a small bar code 48. The bar code 48 can be either partially or totally covered by a scratch-off material 50. In this embodiment, the front bar code 48 preferably contains validation information and as discussed above it might be desirable to cover only a small portion of the bar code 48 such as the security code with the scratch-off material 50. The back of the lottery ticket 44 is then printed with a second uncovered bar code 52. As is conventional, the back of the lottery ticket can also be printed with human readable information such as a set of rules 54 for the game. In this embodiment, the second bar code 54 contains inventory information such as the game, pack, ticket number and a check sum and can include some or all of the validation data. Therefore, by printing the first bar code 48 on the front of the ticket, partially or totally covered by the scratch-off material 50, it is possible to provide secure keyless validation of the ticket by requiring that both bar codes be read during the validation process. The agent terminal can be provided with two bar code readers or a mirror arrangement of the type shown in U.S. Pat. No. 6,053,405 can be used for this purpose. Preferably, the small bar code 48 on the front of the lottery ticket 44 contains, at a minimum, the security digits or the checksum of some or all of the information in the back bar code that is at least partially concealed under the scratch-off material 50. Although it is preferable to cover this type of security information on the front bar code 48 with the scratch-off material 50, it should be noted that other types of information, for example, a portion of the inventory data can be covered by the scratch-off material 50 instead. In this case the object of covering at least a portion of the bar code 48 with the scratch-off material 50 is to prevent validation of the lottery ticket 44 by an agent terminal before the lottery ticket 44 is sold. The amount of the front bar code 48 covered by the scratch-off material 50 can be selected using the criteria discussed above in connection with the bar codes in FIGS. 1 and 2A–C.

It should be understood that the various embodiments of the invention described in connection with FIGS. 1, 2A–C and 3A–B only provide specific examples of how the invention can be implemented on a lottery ticket. The number and location of the bar code(s) and the portion covered by the scratch-off coatings will generally be governed by a number of factors including the type of lottery ticket, e.g., instant or probability, the physical size of the ticket, the size of the play area required, the amount of human readable and display information desired, the type of bar code used, e.g., 1-D or 2-D, the level of redundancy in the bar codes and the number and characteristics of bar code readers in the available agent terminals. Also, the lottery ticket can be configured in such a way that a portion of the scratch-off material 16 used to cover the play indicia in the play area 12 can be used to cover all or part of a bar code such as the bar code 48.

We claim:

1. A lottery ticket comprising:
 a substrate having a first and a second side;
 a play area at least partially covered by a first scratch-off material on one of said sides;
 a bar code including validation data printed on one of said sides; and
 a second scratch-off material covering a portion but not all of said bar code.

2. The lottery ticket of claim 1 wherein said first and second scratch-off materials are the same material and form a single scratch-off cover.

3. The lottery ticket of claim 1 wherein said bar code contains information a portion of which is redundant and wherein at least a portion of said information redundant to said portion of said bar code covered by said second scratch-off material is also covered by said second scratch-off material such that said information can not be read unless at least a portion of said second scratch-off material is removed.

4. The lottery ticket of claim 3 wherein said information is contained in said bar code in the form of code words having a predetermined level of redundancy and wherein said second scratch-off material covers at least one more of said code word words than are defined by said level of redundancy.

5. The lottery ticket of claim 4 wherein said bar code has 18 of said code words printed in a two-dimensional format having 18 code words, wherein said level of redundancy has a level 2 error correction and at least 9 of said code words are covered by said second scratch-off material.

6. The lottery ticket of claim 3 wherein said bar code is in a 2-D PDF format.

7. The lottery ticket of claim 3 wherein said bar code is in a 2-D Data Matrix format and wherein said redundant information includes a set of error correction codes.

8. The lottery ticket of claim 1 wherein said second scratch-off material includes human readable information printed on said second scratch-off material.

9. The lottery ticket of claim 8 wherein said human readable information includes an incentive to a player to scratch-off the second scratch-off material.

10. The lottery ticket of claim 8 wherein said human readable information includes an instruction to a player to scratch-off said second scratch-off material.

11. The lottery ticket of claim 1 wherein said second scratch-off material has a circular configuration.

12. The lottery ticket of claim 1 wherein said second scratch-off material is configured in at least one vertical strip.

13. The lottery ticket of claim 12 wherein said vertical strip covers at least a portion of said validation data.

14. The lottery ticket of claim 12 wherein said bar code includes a start pattern and a stop pattern and said vertical strip covers at least one of said start and stop patterns.

15. The lottery ticket of claim 1 additionally including includes a human readable warning printed on said bar code beneath said second scratch-off material.

16. The lottery ticket of claim 15 wherein said human readable warning is printed in an ink that will not interfere with optical reading of said bar code.

17. The lottery ticket of claim 16 wherein said ink is red ink.

18. The lottery ticket of claim 1 wherein said second scratch-off material is configured in at least one horizontal strip.

19. The lottery ticket of claim 1 wherein said bar code includes both a set of inventory data and said validation data said second scratch-off material does not cover said inventory data.

20. The lottery ticket of claim 19 wherein said second scratch-off material covers only a portion of said validation data.

21. The lottery ticket of claim 20 wherein said bar code is a one dimensional bar code.

22. A lottery ticket comprising:
 a substrate having a first and a second side;
 a play area a least partially covered by a first scratch-off material on one of said sides;
 a first bar code including validation data printed on said first side; and
 a second bar code including inventory data printed on said second side.

23. The lottery ticket of claim 22 including a second scratch-off material covering at least a portion of said first bar code.

24. The lottery ticket of claim 23 wherein said second scratch-off material covers at least a portion of said first bar code.

25. The lottery ticket of claim 22 wherein a second scratch-off material covers only a portion but not all of first said bar code.

26. The lottery ticket of claim 22 wherein said play area is located on said first side.

27. The lottery ticket of claim 26 wherein said second scratch-off material covers a portion but not all of said first bar code.

28. A lottery ticket comprising:
 a substrate having a first and a second side;
 a play area a least partially covered by a first scratch-off material on said first side;
 a first bar code including validation data printed on said first side;
 a second scratch-off material covering at least a portion of said first bar code; and
 a second bar code printed on said second side wherein said second bar code includes inventory data and is not covered by a scratch-off material.

29. The lottery ticket of claim 28 wherein said second scratch-off material covers only a portion but not all of first said bar code.

30. A lottery ticket comprising:
 a substrate having a first and a second side;
 a play area a least partially covered by a first scratch-off material on said first side;
 a first bar code including validation data printed on said first side; and
 a second bar code printed on said second side wherein said second bar code includes inventory data and is not covered by a scratch-off material.

31. The lottery ticket of claim 30 wherein said second bar code includes at least a portion of said validation data.

32. The lottery ticket of claim 31 wherein said first and second bar codes are not covered by a scratch-off material.

33. The lottery ticket of claim 30 wherein said first bar code is covered by a second scratch-off material sufficient to prevent machine reading of at least a portion of said validation data.

34. The lottery ticket of claim 33 wherein said second scratch-off material covers less than all of said first bar code.

35. A lottery ticket comprising:

substrate having a first and a second side;

a play area at least partially covered by a first scratch-off material on one of said sides;

an optically readable code including validation data, a portion of which is redundant, printed on one of said sides; and a second scratch-off material covering a portion but not all of said code and at least a sufficient portion of said redundant validation data such that said information can not be read unless at least a portion of said second scratch-off material is removed.

36. The lottery ticket of claim 35 wherein said code can be optically read where only a predetermined amount but not all of said second scratch-off material is removed from said code.

37. The lottery ticket of claim 35 wherein said code is printed in code words and said predetermined amount of said scratch-off material covers at least one of said code words.

38. The lottery ticket of claim 37 wherein said code is printed in a bar code format.

39. The lottery ticket of claim 37 wherein said bar code format is a 2-D PDF format having code words that include said redundant data.

40. The lottery ticket of claim 35 wherein said optically readable code is in a 2-D Data Matrix format and wherein said redundant information includes a set of error correction codes.

* * * * *